(12) United States Patent
Saker et al.

(10) Patent No.: US 9,014,663 B2
(45) Date of Patent: Apr. 21, 2015

(54) SPONSORED DATA PLAN MANAGEMENT

(71) Applicants: Daniel Saker, La Ville du Bois (FR); Shishir Modi, Pickerington, OH (US); Goutam Sinha, Naperville, IL (US); Sridhar Sripathi, Lewis Center, OH (US); Nathalie Charton, Montrouge (FR); Brad Nicholas, Wheaton, IL (US)

(72) Inventors: Daniel Saker, La Ville du Bois (FR); Shishir Modi, Pickerington, OH (US); Goutam Sinha, Naperville, IL (US); Sridhar Sripathi, Lewis Center, OH (US); Nathalie Charton, Montrouge (FR); Brad Nicholas, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/630,354

(22) Filed: Sep. 28, 2012

(65) Prior Publication Data

US 2014/0094138 A1    Apr. 3, 2014

(51) Int. Cl.
*H04W 4/24* (2009.01)
*H04L 12/14* (2006.01)

(52) U.S. Cl.
CPC .............. *H04W 4/24* (2013.01); *H04L 12/1407* (2013.01); *H04L 12/1475* (2013.01); *H04L 12/1496* (2013.01)

(58) Field of Classification Search
CPC ........ G05F 3/0482; H04W 4/24; H04W 4/26; H04L 12/1407; H04L 12/1475; H04L 12/1496; H04L 12/14; H04L 29/06; H04N 21/2543; H04N 21/8355; H04N 21/4627; H04N 21/613; H04N 21/8113; H04N 21/25891; H04M 15/00; H04M 15/61; H04M 15/43; H04M 11/00; H04M 11/64–11/68

USPC ........................... 455/406; 705/34; 379/114.1
See application file for complete search history.

(56) References Cited

U.S. PATENT DOCUMENTS

| | | | |
|---|---|---|---|
| 6,684,333 B1* | 1/2004 | Walker et al. .................. | 713/168 |
| 7,478,069 B1* | 1/2009 | Ritter et al. ...................... | 705/52 |
| 2011/0238547 A1* | 9/2011 | Belling et al. ................... | 705/34 |
| 2012/0289147 A1* | 11/2012 | Raleigh et al. ............... | 455/3.06 |

OTHER PUBLICATIONS

ETSI TS 129212 v7.4.0 (Apr. 2008)—Universal Mobile Telecommunication System; Policy and Charging control over Gx reference point (3GPP TS 29.212 version 7.4.0 Release 7).*
3GPP TS 29.213 v7.12.0 (Sep. 2011)—3rd Generation Partnership Project; Technical Specification Group Core Network and Terminals; Policy and Charging control Signalling flows and Quality of Service (QOS) parameter mapping (Release 7).*
3GPP TS 29.212 v9.3.0 (Jun. 2010)—3rd Generation Partnership Project; Technical Specification Group Core Network and Terminals; Policy and Charging control over Gx reference point (Release 9).*

* cited by examiner

*Primary Examiner* — Nizar Sivji
(74) *Attorney, Agent, or Firm* — Fay Sharpe LLP

(57) ABSTRACT

A method for managing a Sponsored Data Plan (SDP) is provided in a mobile telecommunications network. The method includes: receiving a first request for an initial charging policy report in response to a detection of a user's data session with an Application Server (AS) (14) of a content provider; sending, in response to the first request, the requested initial charging policy report toward a Policy and Charging Rules Function (PCRF) (16) such that the PCRF (16) selects a first Policy Charging Control Rule (PCC-Rule) in accordance with the report for enforcement at a Policy and Charging Enforcement Function (PCEF); receiving a second request to perform an online subscription of the user to the SDP; and sending, in response to the second request, information about the SDP toward the PCRF (16) such that the PCRF (16) selects a second PCC-Rule in accordance with the information for enforcement at the PCEF.

19 Claims, 3 Drawing Sheets

SPONSORED DATA PLAN MANAGEMENT

BACKGROUND

The present inventive subject matter relates generally to the art of mobile and/or wireless telecommunications. Particular but not exclusive relevance is found in connection with 3G ($3^{rd}$ Generation) and LTE (Long Term Evolution) wireless networks, and accordingly the present specification makes specific reference thereto. It is to be appreciated however that aspects of the present inventive subject matter are also equally amenable to other like applications and/or network environments.

Using 3G and LTE wireless networks, there are new business models emerging involving mobile network operators (MNOs) or wireless service providers, subscribers or end users and $3^{rd}$ party content providers. In some business models, a $3^{rd}$ party content provider may be willing under certain circumstances to offer a sponsored data plan to an end user subscribing to mobile or wireless data services provided by a specific network operator.

For example, an end user may subscribe to mobile data services provided by an MNO or other wireless service provider, e.g., such as Verizon or AT&T. Commonly, the end user may purchase a data plan, e.g., for a set fee or otherwise, from the MNO or wireless service provider. In accordance with the user's data plan, the user is allotted a given amount of data (e.g., so many megabytes (MB)) which they can have transported over a mobile telecommunications network of the operator or service provider within a given billing cycle, e.g., for download to their mobile telephone or other wireless device, generally referred to herein as user equipment (UE).

At times, the user may employ their UE to access (e.g., to download or stream) content from an application server of a $3^{rd}$ party content provider. Optionally, the content provider may charge a fee for such access. In any event, the content is generally transported from the content provider's application server to the user's UE over the mobile/wireless network provided and/or operated by the MNO or wireless service provider. Usually in this case, the amount of data transported over the network is deducted from and/or charged against the user's data plan allotment. However, under certain circumstances, the content provider (and/or optionally the MNO) may sponsor the data session used to deliver the content over the network, i.e., the content provider (and/or optionally the MNO) may offer and/or provide a sponsored data plan, such that by the end user subscribing to the sponsored data plan, all or some portion of the transported data is not deducted from and/or charged against the user's data plan allotment, but rather it may be deducted from and/or charged against the sponsored data plan.

Such arrangements present certain challenges. For example, it remains a challenge for content providers to determine the network operator to which a subscriber belongs. There is a further challenge to inform the network operator's online charging system about an end user's subscription to a sponsored data plan offered by the content provider and accepted by the end user, and/or about the details of sponsored data plan, e.g., such as the sponsored services, sponsored time-band, sponsored quality of service, type of sponsorship, etc. A further challenge can be presented for the network operator to detect a sponsored service among multiple data sessions initiated by a user across the operator's network so as to be able to apply the sponsored data plan to such a detected service. Still another challenge may be for network operators to detect a user's access to a content provider's application server so as to potentially be able to offer their own promotional data plan enabling access to the same service but with the network operator's sponsored data plan subscription, e.g., involving a promotional or preferential tariff, quality of service, etc. Yet another challenge is maintaining a user's privacy and/or network neutrality.

Accordingly, a new and/or improved system and/or method is disclosed which addresses the above-referenced challenge(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method for managing a Sponsored Data Plan (SDP) is provided in a mobile telecommunications network. The method includes: receiving a first request for an initial charging policy report in response to a detection of a user's data session with an Application Server (AS) of a content provider; sending, in response to the first request, the requested initial charging policy report toward a Policy and Charging Rules Function (PCRF) such that the PCRF selects a first Policy Charging Control Rule (PCC-Rule) in accordance with the report for enforcement at a Policy and Charging Enforcement Function (PCEF); receiving a second request to perform an online subscription of the user to the SDP; and sending, in response to the second request, information about the SDP toward the PCRF such that the PCRF selects a second PCC-Rule in accordance with the information for enforcement at the PCEF.

In accordance with other embodiments, an apparatus is provided that executes the foregoing method and/or a non-transitory machine-readable medium is provided including a computer program which when executed performs the foregoing method.

In accordance with another embodiment, an online charging system (OCS) is provided for use in a mobile telecommunications network. The OCS includes: an exposed Application Programming Interface (API) having a first interface for communicating with an Application Server (AS) of a content provider; a second interface for communicating with a Policy and Charging Rules Function (FCRF); and a third interface for communicating with a Policy and Charging Enforcement Function. The OCS is operative to: receive a first request over the second interface for an initial charging policy report in response to a detection of a user's data session with the AS of the content provider; send a first response to the first request toward the PCRF over the second interface, including the requested initial charging policy report, such that the PCRF selects a first Policy Charging Control Rule (PCC-Rule) in accordance with the report for enforcement at the PCEF; receive a second request via the exposed API to perform an online subscription of the user to a sponsored data plan (SDP); and send a second response to the second request toward the PCRF, including information about the SDP, such that the PCRF selects a second PCC-Rule in accordance with the information for enforcement at the PCEF.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Described herein is a method and/or system providing end-to-end management of sponsored data plans. To this end, a sponsored data plan is defined via a meta-model, e.g., that is exportable from a content provider's application server to an online charging system (OCS) of a network operator and a policy and charging rules function (PCRF) through an exposed application programming interface (API) platform. Suitably, requests to register subscribers to sponsored data plans are submitted by the content provider's application server to the network operator's OCS via the API platform. A mechanism is provided to ensure sponsored data session detection. Optionally, the mechanism may be provided, e.g., via suitable layer 3 (transport layer) and/or layer 7 (application layer) configuration at the policy and charging enforcement function (PCEF), or via the exposed API platform. In the latter case, appropriate messaging and/or signaling from the content provider's application server to the network operator's OCS may provide the trigger to ensure a differentiated Gy session related to the sponsored data.

Figure 1:
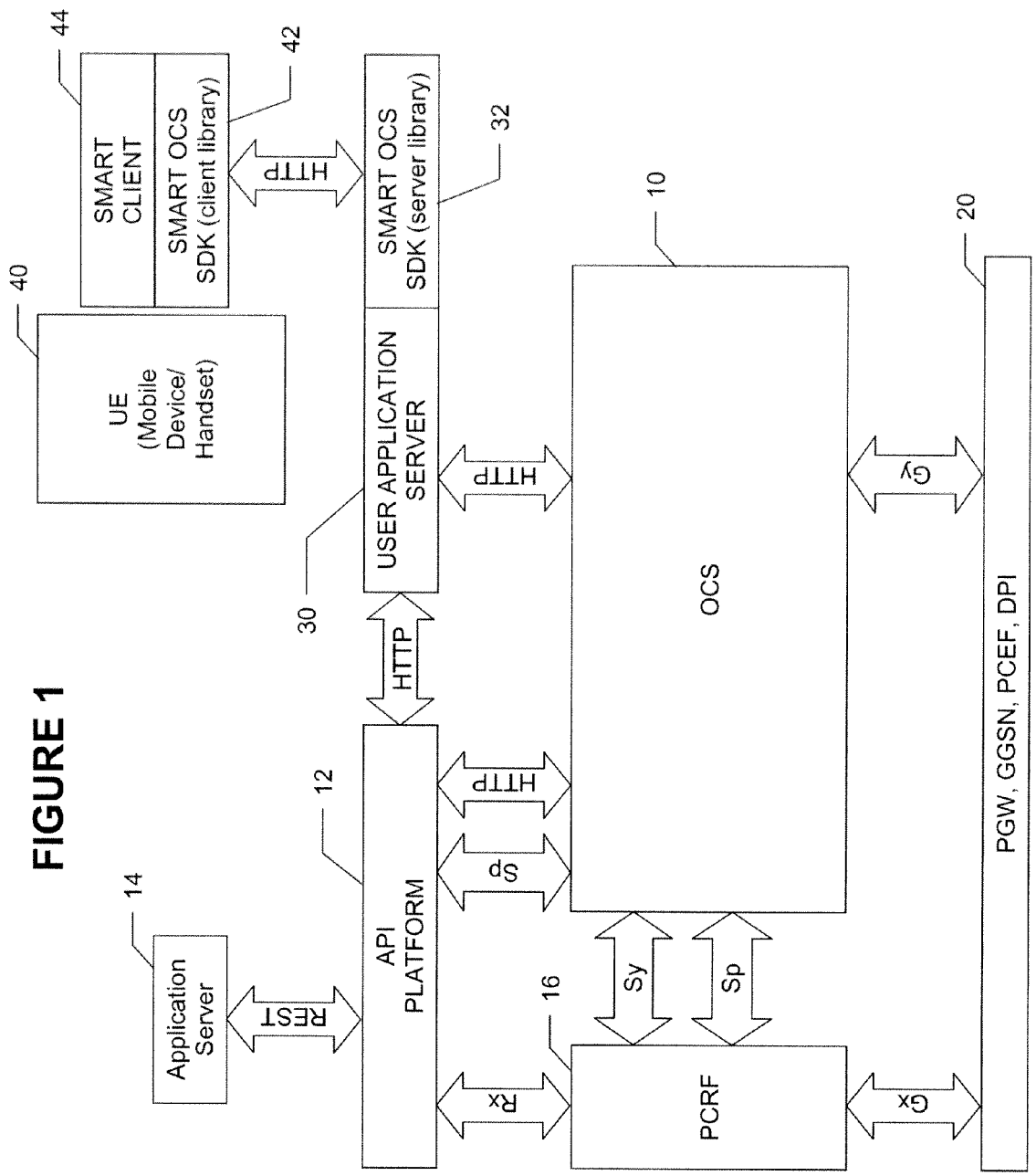
FIG. 1 is a diagrammatic illustration showing an exemplary network architecture suitable for practicing aspects of the present inventive subject matter.

With reference now to FIG. 1, there is shown a suitable network architecture for practicing aspects of the present inventive subject matter. As shown, the architecture includes the aforementioned OCS 10 of a network operator. The OCS 10 is linked to and/or otherwise in operative communication with the aforementioned API platform 12, e.g., via a suitable hypertext transfer protocol (HTTP) interface or the like and/or a suitable Sp interface or the like. In turn, the API platform 12 is linked and/or otherwise in operative communication with the content provider's application server 14, e.g., via a suitable representational state transfer (REST) interface or the like.

The API platform 12 is also linked and/or otherwise in operative communication with a PCRF 16, e.g., via a suitable Rx interface or the like. As shown, suitable Sy and Sp interfaces or the like interconnect and/or otherwise link the PCRF 16 and the OCS 10 to one another. Suitably, via a Gy interface or the like, the OCS 10 is linked and/or otherwise in operative communication with the general packet radio service (GPRS) core 20 (e.g., including a packet data network gateway (PGW) 22, a PCEF 24, a gateway GPRS support node (GGSN) and a deep packet inspection (DPI) part). Likewise, the PCRF 16 is linked and/or otherwise in operative communication with the GPRS core 20 via a suitable Gx interface of the like.

In the illustrated embodiment, a user application server (UAS) 30 is linked and/or otherwise in operative communication with the OCS 10 and the API platform, e.g., via HTTP interfaces or the like. Suitably, the UAS 30 includes and/or has access to a sever side software development kit (SDK) 32 and/or server side software library. Also shown, is a handset or client device 40 (e.g., such as a smart phone or the like). The handset or client device 40 is suitably equipped and/or otherwise provisioned with a client side SDK 42 and/or client side software library, e.g., used to develop and/or support a smart client 44 residing and/or operational on the handset or client device 40. As shown, an HTTP interface or the like interconnects and/or otherwise links the SDKs 32 and 42 to one another and/or otherwise supports communication of the client application 44 with the UAS 30 and/or OCS 10.

As mentioned above, in accordance with embodiments disclosed herein, a sponsored data plan is suitably defined by a meta-model that describes the sponsored data plan according to one or more established parameters and/or a defined schema between the network operator and the content provider. Suitably, the meta-model identifies date services involved in the plan, the degree of sponsorship (e.g., full or partial sponsorship), associated notification scheme (i.e., what to notify of, when to notify and who to notify), usage restriction for the sponsored data plan (e.g., time-band, maximum volume allowance, etc.), associated policy charging control rules (PCC-Rule) that define the charging and the bandwidth and quality of service (QoS) to be applied. Suitably, the PCC-Rule is selected by the PCRF 16 and enforced at the PCEF and this allows determining the rating group, the service-identifier or charging-key to be used to be used for charging and the bandwidth and QoS to be granted for the user session.

More specifically, one parameter defined in the meta-model is a sponsored data plan flow identifier, otherwise referred to as the service-identifier or data flow identifier. Suitably, this parameter uniquely determines the data service accessed by the sponsored data plan in question which can be mapped to a service identifier or to a data flow identifier and/or to a rating group. Another parameter of the meta-model identifies the application server 14 of the content provider. For example, this identifier may be an internet protocol (IP) address (e.g., in the form 192.123.222.xx) or a domain (e.g., in the form www.domainname.com) or a uniform resource locator (URL) pattern (e.g., in the form www.domainname.*). Yet another parameter of the meta-model may be a unique identifier that identifies the content provider.

Other parameters of the meta-model include a sponsored data plan identifier which identifies the sponsored data plan, a version identifier which identifies the version of the sponsored data plan, and start and end dates in between which sponsored data plan is valid. The meta-model also suitably includes a subscription rule for the sponsored data plan. The subscription rule defines how often subscriptions to the SDP may obtained by a user, e.g., a single shot subscription valid between given dates or a recurring subscription with a valid start date.

The meta-model also may define rating rules for the SDP that define a rating unit (e.g., time, volume or event) and the quantity sponsored. For example, a time-based rating rule may define the units in terms of seconds or minute or hours and also define the number of units so sponsored, i.e., such that the SDP covers so many units for a given price or cost. In another example, the rating rule may define the units in terms of kilobytes (Kb) or megabytes (Mb) along with the number of units so sponsored, i.e., such that the SDP covers so many units for a given price or cost. In still another example, the rating rule may define a per event or per session rating, i.e., such that the SDP covers so many events or sessions for a given price or cost. Of course, in each of the foregoing examples, the price or cost may be defined in the rating rule so as to be free to the end user if so desired, i.e., the SDP has no cost or price for the subscription thereto, either in total or for some limited portion (e.g., the first so many units of time or volume or events may be free).

Another meta-model parameter is a subscription usage rule for single shot or single usage subscriptions. This rule defines the conditions under which the SDP may be used by subscribers of the network operator. For example, the rule may be time based and define a time band during which the SDP can be used by subscribers. In this case, the rule may include a start time and/or date and an end time and/or date. In another case, this rule may be threshold based and define a data volume threshold over which the SDP may no longer be usable by a subscriber. The rule may further define what types of subscriber may use the SDP, e.g., all subscriber of the network operator, or only prepaid or only postpaid subscribers, etc.

Yet another meta-model parameter is a notification rule. The notification rule defines under what conditions and/or when selected notifications will be sent, who those notification will be send to (e.g., the user, the network operator, the content provider, etc.) and the content of the notifications. The meta-model may also define the SDP subscription fee, if any.

The meta-model suitably also includes the applicable PCC-Rule for the SDP, which in turn determines or is used to determine the rating group for charging purposes and/or the QoS and/or uplink and/or downlink bandwidths applied to the user's data session.

The meta-model may further include a parameter which reflects the state of the SDP, e.g., as created in the OCS, active, inactive, etc. One other parameter that may be included in the meta-model is a revenue settlement rule, e.g., that may be fixed or some percentage, which defines revenue sharing as between the content provider and the network operator to the extent applicable.

In one suitable embodiment, the SDP is registered in the OCS 10 of the network operator, e.g., by exporting a meta-model with suitably define parameters from the application server 14 of the content provider to the OCS 10 of the network operator via the API 12. In practice, via the REST/HTTP interface, the content provider is able to send a request to export the SDP meta-model towards the network operator's OCS 10. In this way, the content provider's SDP can be included in the product catalogue of the network operator's OCS 10, e.g., along with a tariff plan, QoS plan, notification plan, usage plan, etc.

Suitably, the API 12 supports the export of the SDP from the content provider's application server 14 to the network operator's OCS 10 and allows for selective activation of the SDP. The API 12 is also arranged to permit the modification of SDP characteristics and/or the meta-model parameters.

In practice, an end user may selectively access the application server 14 of the content provider, e.g., to download or stream music or videos or other content or data or applications therefrom. In this case, the content provider detects that the end user belongs to or is a subscriber of a specific network operator having a partnership with the content provider. For example, this detection may be based on a device IP address and/or a smart client application identifier associated with the client and/or device used by the end user to access the application server 14. In the latter case, the network operator suitably provides an appropriate SDK with API to its partner content providers, which are in turned used by each partner content provider to embed in its developed smart client an API to access exposed functionality of the network operator as well as a dedicated access point name (APN) which is used to access the content provider's content.

In one suitable embodiment, the content provider's application server 14 can prompt, invite and/or otherwise propose to an accessing user that they subscribe to and/or access an associated SDP, e.g., with preferential prices and/or QoS. Provided the user accepts or otherwise grants approval to subscribe to the SDP, the content provider suitably sends a subscription request (e.g., from the application server 14) to the OCS 10 of the network operator (e.g., via the API 12) to register the user (which is already a subscriber of the network operator) for a subscription to an identified SDP, e.g., which has already be configured in the OCS 10.

Suitably, for charging and policy control purposes, the OCS 10 is provisioned and/or otherwise configured to detect if a user is accessing and/or has otherwise subscribed to a SDP. For example, either the PCEF or PGW/GGSN/PCEF supports layer 3 IP header inspection for source and destination address determination. In one embodiment, the network operator optionally configures a dedicated APN for a SDP with an identified IP address of the content provider's servers, e.g., such as the application server 14. Accordingly, service detection can be based on the IP address (i.e., destination address) with a dedicated APN, and a static PCC-Rule can be used to determine the QoS and rating group applied to all subscribers' traffic across the APN. The PGW/GGSN suitably triggers the OCS 10 for credit control with the identified rating group through a Diameter Gy credit control interface to enable the OCS 10 to determine tariff, access and usage control and to notify the PCRF 16 about policy control. Suitably, differentiation is made per sponsored application server IP address, but not per accessed URL/service provided by the same application server IP address.

Alternately, the PCEF and/or the PGW/GGSN support layer 7 DPI functionality. This DPI functionality allows the configuration of an IP filter for given URLs, domains and/or sets of URLs. In this case, a policy rule can be configured in the PCRF 16 and enforced at the PWG/GGSN/PCEF with a dedicated rating group and service-identifier per defined URL, domain or set of URLs. In this way, the OSC 10 can identify the data session related to a sponsored service.

In yet another embodiment, for charging and policy control purposes, the OCS 10 is provisioned to detect if a user is accessing and/or has otherwise subscribed to a SDP based on interaction with the API 12. In this case, the exposed API 12 is used by the application server 14 at the start of user access to the sponsored domain to submit a request to the API platform 12. In response to the request the API platform 12 may react in one or more of a number of ways.

Optionally, the API platform 12 may fork a Diameter Rx request toward the PCRF 16, as well as fork another request (e.g., either Diameter or simple object access protocol (SOAP)) to the OCS 10. This enables the OCS 10 to get parameters related to the SDP (e.g., a charging key, application server address, etc.) that can be used in mapping with attribute value pairs (AVPs) transmitted in the Gy interface for service determination. Alternately, the API platform 12 may send a request to the OCS 10 that will then execute it and relay it also the PCRF 16. In yet another alternate embodiment, the API platform 12 will only send the request to the PCRF 16 that will in turn execute the same to select the PCC-Rule to be enforced at the PCEF. For PCC-Rule selection, the PCRF 16 suitably interrogates the OCS 10 via the Sy interface. Suitably, the Sy interface is extended to include in the PCRF to OCS request some additional parameters to enable the OCS 10 to determine that the SDP is being invoked. For example, these additional parameters may include the charging key of the sponsored data flow and the sponsored application server address. Again, these parameters can then be used in the mapping with AVPs transmitted in the Gy interface for service determination.

In any event, the PCRF 16 suitably selects the PCC-Rule and instructs it to the GGSN/PCEF for activation and/or application. The PCC-Rule enables PGW/GGSN/PCEF to determine the rating group (mapped to the charging key) associated with traffic directed towards the IP address of the application server 14. The PGW/GGSN/PCEF will then trigger the charging at the OSC 10 via a suitable Diameter Ro and/or Gy interface for session charging. The OCS 10 would be based on mapping between the charging key received previously through the Rx or Sy interface and the rating group received via the Gy interface.

In another suitable embodiment, a smart client application 44 may be developed by the content provider, e.g., for the end user's client device 40. This smart client application 44 may then be used for service detection purposes. The network operator, for example, may distribute to its partner content providers an SDK 42 to be used when they are building their smart client application 44. Suitably, the SDK 42 enables the client device 40 and/or a developed client application 44 thereon to call or otherwise link to exposed APIs to access the OCS 10 for self-care and/or online subscription management by the user. There may also be provisioned the option to access the PCRF 16 via exposed Rx API and/or other network functionality, e.g., like statistical information related to SDP usage, etc. Using the SDK 42, the partner content provider may also develop a handset application client 44 that enables the content provider to push a promotional SDP towards a subscriber. For example, the SDP may be pushed by the content provider to the handset or mobile device 40 of the user. If the user then opts-in, the developed application can submit a request to the OCS 10 to register the user for the offer and/or otherwise subscribe the user to the SDP already configured in the OCS 10. This embodiment has an advantage of additional privacy, and it enable the setting of preferences and asking the user if they wish to accept the pushed SDP and/or promotional SDP during their data session. Suitably, preference may be set by the user at the time of account activation, or it can be an option on a self-care menu that the user has the capability to change as they see fit. Additionally, the smart client 44 can be pre-configured in the handset or mobile device 40 with a pre-defined APN for sponsored data access. The smart client 44 may also include or otherwise be provisioned with a client application identifier which can in turn be used to enhance subscriber identification by the network operator and/or content provider.

In one optional embodiment, the SDK 42 may also be used to develop a smart client 44 that is embedded with a light URL service detection (i.e., a smart client with embedded DPI). In this case, the smart client 44 will be able to detect any URL initiated by end user. For each URL, it will be able to count uplink bytes and downlink bytes from and towards the handset or mobile device 40. Suitably, there is no inspection of content by this particular DPI, but rather only the retrieving of a uniform resource identifier (URI), e.g., using a request like "Get HTTP" from the HTTP header. Also, usage control can be implemented by this smart client 44 per service and/or per URL as it has embedded therein its own DPI functionality. Optionally, the smart client 44 can have a defined white list (of allowed URLs) and/or defined blocked list of URLs. This white list and/or blocked list of URLs can be communicated by the smart client 44 in the handset and/or mobile device 40 and the OCS 10 and/or updated via suitable self-care, e.g., when the end user modifies his subscription. Also the limit thresholds (in volume, duration, unit) can be communicated for each URL of the white list by a smart charging application server 30 towards the smart client 44 every billing cycle or when thresholds are modified via self-care. Accordingly, the UAS 30 can build various subscription offers and foreword them to the client application 44. Such offers may include, e.g., a first offer with a list of unlimited access URLs (like to Google, Yahoo, etc.); another offer with a list of Limited access URLs (like to YouTube, FaceBook) including up to 1 GB per month for a given monthly fee; and still another offer with a list of premium URLs (like access to the Disney World site) including up to 1 GB per for a different monthly fee. Accordingly, any access to any of these URLs can be detected by the smart client DPI and access control can then be based on the subscription type and/or also the white list and/or blocked list. If a user accesses a new URL for the first time, and if a tracking option is activated in the handset 40, then this URL can be communicated by smart client 44 to OCS 10 which can check if there are any SDP offers to be pushed by notification to this subscriber. For example, if a user is connecting to the New York Times Journal online, the OCS 10 is aware that the user can subscribe to unlimited access to this URL for a given monthly fee. Such a notification may then be pushed to the user. If the user accepts this subscription, this URL may be added to the list of unlimited access URLs for the user. This can then be communicated to other network elements as desired.

Optionally, the SDKs will enable a network operator to expose APIs and enable content providers and/or other partners to develop the smart client application 44 with the ability to access and number of network functionalities whose exposure the network operator can enable and/or disable as they see fit. For example, APIs may support any one or more of the following:

an account consultation function with status, balances, used credit, remaining credit, remaining data allowance, consumption follow up, top-up history, last operations history, update of warning, overage thresholds, etc.;

browsing function for browsing a product catalogue and displaying available data service and SDP offers according to a subscriber's profile and/or data plan, online subscription and update of subscribed data plan (increase thresholds or upgrade to higher data plan) or managing a user's own account or a family account;

setting preferences and receiving push notification and setting payment mode or performing credit transfer from one account to another or converting loyalty points into data allowances or setting blocked/white list of services for family members; and a display, e.g., such a gauge or the like, which illustrates a discount level, e.g., in terms of a percentage or otherwise, that is updated at each refresh period according to a location or zone based tariff and/or charging manager or application, e.g., such as Alcatel-Lucent's Instant Zone (IZO).

In one optionally embodiment, the SDK can be used to expose an API towards a partners application server 14 for the purpose of communicating and/or exchanging some business intelligence and/or information related to their SDPs (e.g., according to the network operator's configuration by enabling or disabling such capabilities). For example, the business analysis can be launched periodically to enable communicating various information such as: per SDP, the global generated revenue, subscribed users, distributed per location, global upload (UP)/download (DL) volume, global uplink/downlink, per peak hour, off-peak hour, average session duration, etc.; or per subscriber, global data volume UP/DL transmitted, frequent location, time-band, session duration, etc. In practice, such information can potentially help the operator and partner content providers to adjust maximum data allowance, associated QoS, tariff, time band for such SDPs as well as better segmentation of SDPs and subscribers.

Suitably, the OCS 10 can be provisioned with a table of SDPs. This table can be provisioned in the OCS 10 during the export/import of SDPs from the content provider's application server 14 and managed through the exposed API platform 12. In practice, this table can be also used to get more information about a SDP when the OCS 10 is triggered by the PGW/GGSN/PCEF via the Gy interface based on Gy rating-group AVP or via an extended Sy interface with the PCRF 16. Suitably the extended Sy interface may contains parameter for the sponsor Id, the SDP Id, the sponsor application server Id, the sponsored service Id and its charging key, the sponsored charging scheme, the sponsored notification scheme, etc. At the start of sponsored data session, suitably the PCRF 16 is triggered by either of the PCEF/PGW/GGSN via the Gx interface. Alternately, the PCRF 16 is triggered by the API platform 12 on behave of the content provider application server 14 through the Rx interface. Accordingly, the PCRF 16 interrogates the OCS 10 via the extended Sy interface to get the subscriber consumption status through an initial charging policy request (SLR-Initial Request). Suitably, the Sy interface is extended to permit parameters sent by PCRF 16 to OCS 10 to include other input parameters that were transmitted to PCRF 16 via the Gx and/or Rx interface. For example, these additional parameters may include: the charging key, a sponsor Id, a sponsored application Id. Suitably, these extended parameters may be transmitted from PCRF 16 to OCS 10 via the Sy interface during the initial charging policy request. These parameters will enhance the OCS capabilities of sponsored service identification and can be used by the OCS 10 to interrogate its internal product catalogue including the table of imported SDPs. Of course, the Sy interface can be further extended to accommodate other parameters like AF-Correlation-Information and PCC-Rule-Name to be transmitted from PCRF 16 to the OCS 10 during initial charging policy request to yet further enhance the OCS capabilities for sponsored service identification.

Figure 2:
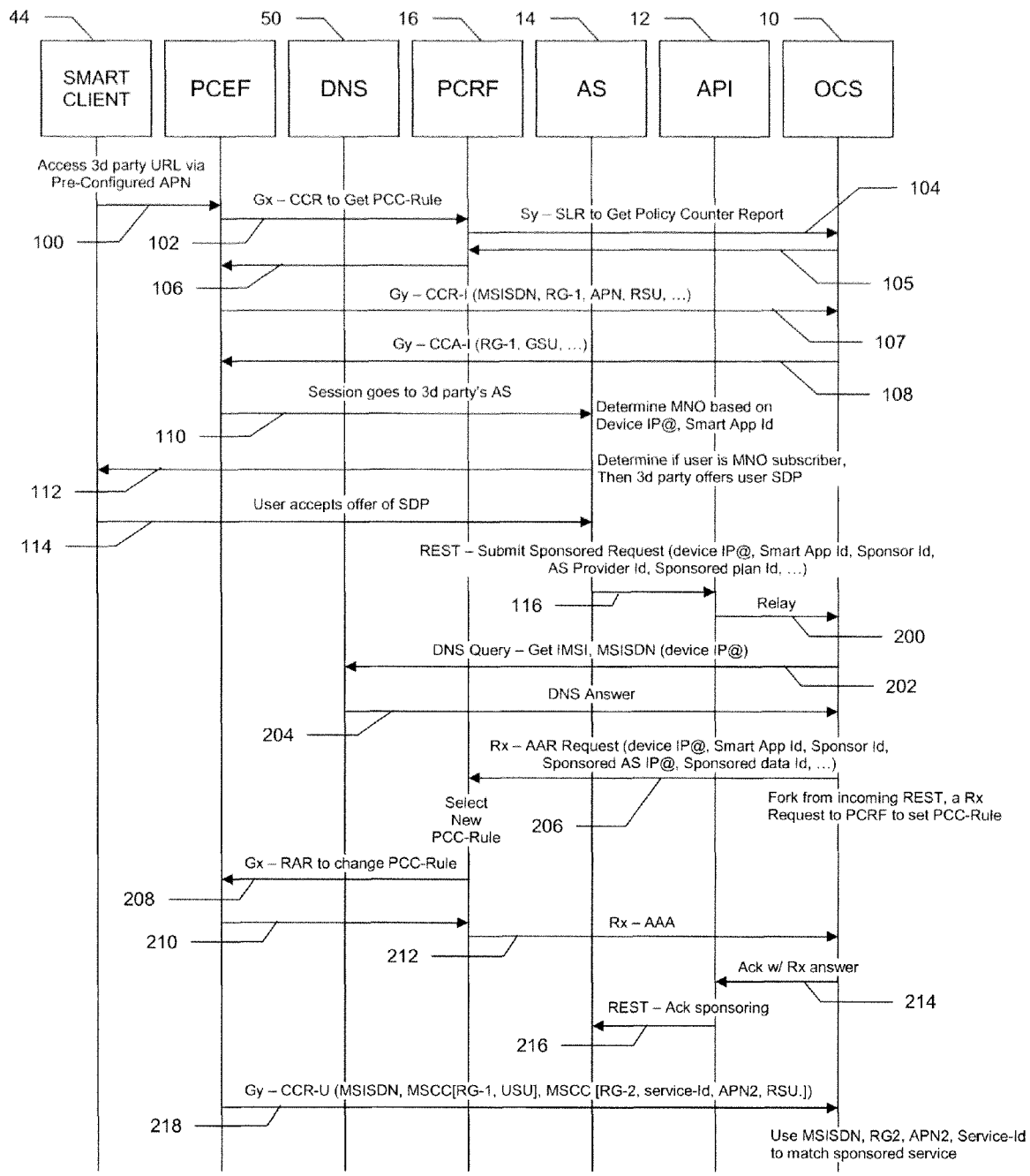
FIG. 2 is a post and rail diagram illustrating one exemplary embodiment of a method practiced in accordance with aspects of the present inventive subject matter.
Figure 3:
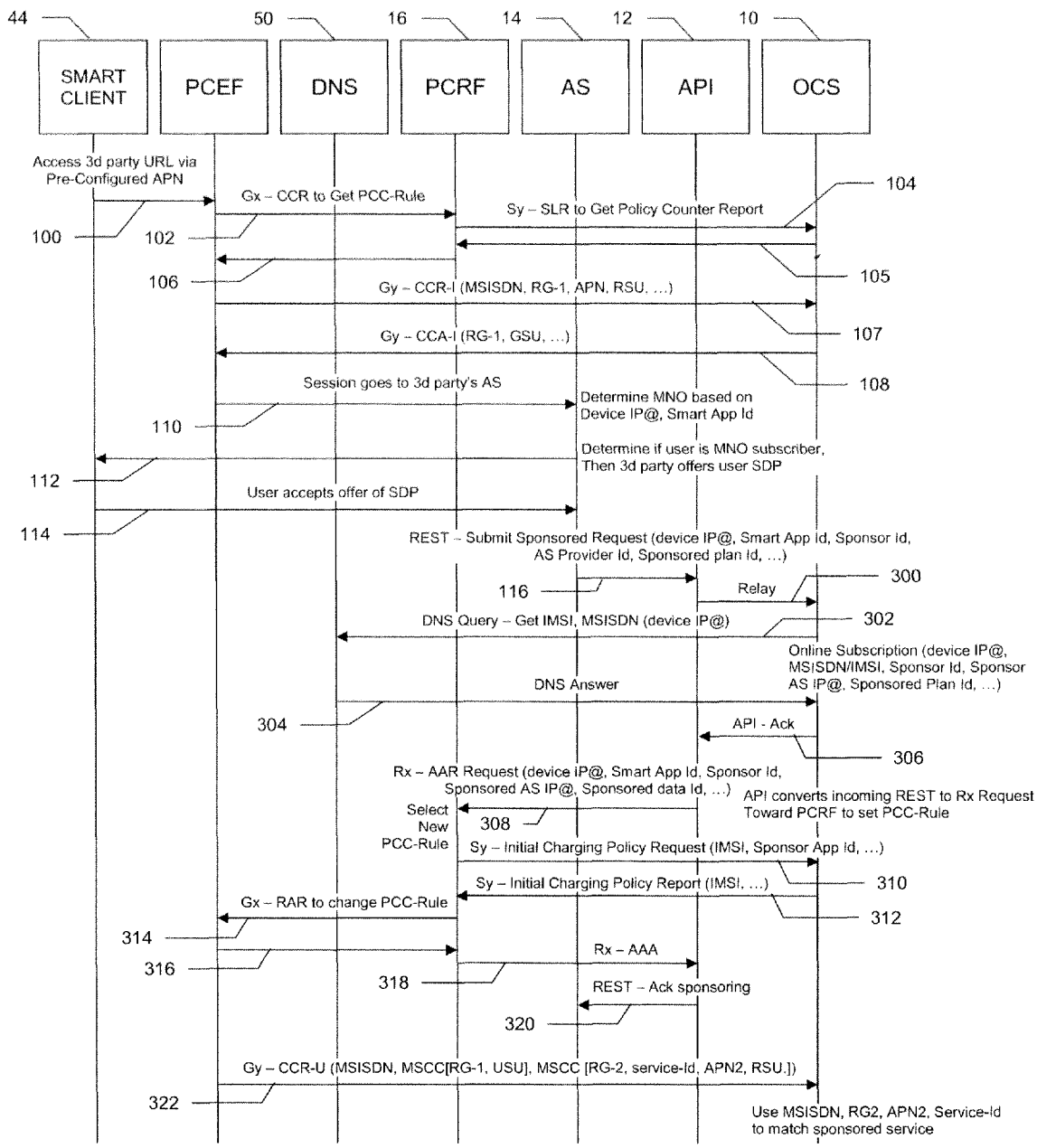
FIG. 3 is a post and rail diagram illustrating another exemplary embodiment of a method practiced in accordance with aspects of the present inventive subject matter.

With reference not to FIGS. 2 and 3, there are shown two exemplary scenarios illustrating aspects of the present inventive subject matter. In both scenarios, the initial steps are essentially the same so they will be described herein but once.

In practice, a user (e.g., employing the smart client 44 on the client device 40) access the web site or application server 14 of the content provider, e.g., at a particular URL and/or via a pre-configured APN. As shown, in a first step 100, the session will go through the network operator's PCEF based on the configured APN in the handset or mobile device 40. Suitably, this APN is specific for sponsored data.

At step 102, the PCEF contacts the PCRF 16 (e.g., via the Gx interface) for a PCC-Rule to apply, and at step 104, the PCRF 16 interrogates the OCS 10 for an initial charging policy report, and at step 105, the OCS 10 returns the same.

Accordingly, the PCRF 16 selects the appropriate PCC-Rule and at step 106 forwards the same to the PCEF where the selected PCC-Rule is applied. At step 107, the PCEF triggers the OCS 10 (e.g., via the Gy interface) for credit control of the user's session with a normal rating across the APN (e.g., a Rating-Group of RG-1). Accordingly, at step 108, the OCS 10 checks the user's account, allocates a volume slice and answers the PCEF.

At step 110, the PCEF lets the user's session go to the content provider's application server 14. In this embodiment, the content provider detects that this subscriber is from a network operator with which the content provider has a partnership (i.e., a network operator which the content provider has established a SDP). For example, such detection may be made based on the source address of the mobile device 40, e.g., the device's IP address.

Accordingly, at step 112, the content provider can propose or invite the user to subscribe to and/or register for the SDP, which will enable the user to access the data from the application server 14, e.g., without incurring the cost for transport across the operator's network or at some reduced cost or otherwise, e.g., as defined in the meta-model for the SDP. In this particular example, at step 114, the user accepts the offered SDP. At step 116, the application server 14 sends a REST request to the API platform 12 with information about: the subscriber's device IP address, the SDP Id, the sponsor's or content provider's Id, the address of the application server 14, the Id of the smart application 44, the sponsoring scheme, charging key, etc.

At this point, the two scenarios may differ. As shown in the first scenario depicted in FIG. 2, at step 200, the API platform 12 relays the request toward the OCS 10, which in turn uses the information therein to perform an online subscription of this user to the corresponding SDP already configured in the OCS 10. At step 202, the OCS 10 gets the subscriber's IMSI/MSISDN (international mobile subscriber identity/mobile station international subscriber directory number) based on a query to an applicable domain name server (DNS) 50 and the IP address of the device 40. In response to the query, at step 204, the DNS 50 returns the applicable subscriber identity for the corresponding packet data protocol (PDP) context (i.e., for the IP address of the device 40).

At step 206, the OCS 10 builds an Rx request from the incoming REST request that was relayed thereto in HTTP or Rx form by the API platform 12. The build Rx request is accordingly forwarded to or otherwise sent towards the PCRF 16 with information about the SDP. In turn, at step 208, the PCRF 16 uses the SDP information received from the OCS 10 to select a new PCC-Rule (in accordance with the SDP) and forwards the same so as to be enforced at the PCEF. At step 210, the PCEF acknowledges installation of the newly acquired PCC-Rule for the SDP, and at step 212, the PCRF 16 in turn returns a suitable acknowledgement back to the OCS 10, which in turn returns (at step 214) a suitable acknowledgement to the API platform 12, which in turn returns (at step 216) a suitable acknowledgement to the content provider's application server 14 of a successful subscription to the SDP.

Meanwhile, at step 218, the PCEF triggers the OCS 10 with a new Rating-Group (e.g., RG-2) that was installed by the PCC-Rule selected by the PCRF 16 for the SDP. In practice, this Rating-Group may be associated with a dedicated APN for the SDP. Accordingly, the OCS 10 will not count data for this particular user session against the user's own account based on the correlation between the dedicated APN, dedicated Rating-Group for this APN, subscriber ID and charging key. Rather, the OCS 10 will charge the data session against the content provider and/or sponsor's account based on the correlation between the dedicated APN, dedicated Rating-Group for this APN, subscriber ID and charging key to find the sponsor Id and associated account.

As shown in the second scenario depicted in FIG. 3, at step 300, the API platform 12 relays the request toward the OCS 10, which in turn uses the information therein to perform an online subscription of this user to the corresponding SDP already configured in the OCS 10. At step 302, the OCS 10 gets the subscriber's IMSI/MSISDN (international mobile subscriber identity/mobile station international subscriber directory number) based on a query to an applicable domain name server (DNS) 50 and the IP address of the device 40. In response to the query, at step 304, the DNS 50 returns the applicable subscriber identity for the corresponding packet data protocol (PDP) context (i.e., for the IP address of the device 40).

At step 306, the OCS 10 submits a suitable acknowledgement to the API platform 12 of the successful operation. In response, at step 308, the API platform 12 builds an Rx request from the incoming REST request that was previously relayed thereto from the application server 14. The build Rx request is accordingly forwarded to or otherwise sent towards the PCRF 16. In turn, at step 310, the PCRF 16 interrogates the OCS 10 via the Sy interface about the charging policy report, and at step 312, the OCS 10 answers the PCRF 16 with the initial charging policy report associated with the SDP.

At step 314, the PCRF 16 selects a new PCC-Rule (in accordance with the initial charging report) and forwards the same so as to be enforced at the PCEF. At step 316, the PCEF acknowledges installation of the newly acquired PCC-Rule for the SDP (e.g., with a new Rating-Group and possibly a new APN), and at step 318, the PCRF 16 in turn returns a suitable acknowledgement back to the to the API platform 12, which in turn returns (at step 320) a suitable acknowledgement to the content provider's application server 14 of a successful subscription to the SDP.

Meanwhile, at step 322, the PCEF triggers the OCS 10 with a new Rating-Group (e.g., RG-2) that was installed by the PCC-Rule selected by the PCRF 16 for the SDP. In practice, this Rating-Group may be associated with a dedicated APN for the SDP. Accordingly, the OCS 10 will not count data for this particular user session against the user's own account based on the correlation between the dedicated APN, dedicated Rating-Group for this APN, subscriber ID and charging key. Rather, the OCS 10 will charge the data session against the content provider and/or sponsor's account based on the correlation between the dedicated APN, dedicated Rating-Group for this APN, subscriber ID and charging key to find the sponsor Id and associated account.

While described above with respect to specific examples and/or embodiments, it is to be appreciated that various alternatives are contemplated. For example, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the various elements and/or nodes may include a processor, e.g., embodied by a computing or other electronic data processing device, that is configured and/or otherwise provisioned to perform one or more of the tasks, steps, processes, analysis, methods and/or functions described herein. For example, one or more computers or servers or other electronic data processing devices may be employed in the system and may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a mobile telecommunications network, a method for managing a Sponsored Data Plan (SDP) comprising:
  receiving a first request, at an Online Charging System (OCS), for an initial charging policy report in response to a detection of a user's data session with an Application Server (AS) of a content provider;
  sending, in response to the first request, the requested initial charging policy report toward a Policy and Charging Rules Function (PCRF) such that said PCRF selects a first Policy Charging Control Rule (PCC-Rule) in accordance with said report for enforcement at a Policy and Charging Enforcement Function (PCEF);
  receiving a second request, at the OCS, to perform an online subscription of the user to the SDP;
  sending, in response to the second request, information about the SDP toward the PCRF such that said PCRF selects a second PCC-Rule in accordance with said information for enforcement at the PCEF;
  receiving, in response to enforcement of the first PCC-Rule at the PCEF, a first trigger prompting association of the user's data session with a first Rating-Group (RG-1); and
  receiving, in response to enforcement of the second PCC-Rule at the PCEF, a second trigger prompting association of the user's data session with a second Rating-Group (RG-2).

2. The method of claim 1, said method further comprising: exposing an Application Programming Interface (API) through which the second request is received.

3. The method of claim 2, wherein said first request is received from the PCRF.

4. The method of claim 3, wherein the first request is received over a Diameter Sy interface.

5. The method of claim 2, wherein the second request is received via the API from the AS over a representational state transfer (REST) interface.

6. The method of claim 5, said method further comprising: building a Diameter Rx request to send information about information about the SDP toward the PCRF.

7. The method of claim 6, wherein building the Diameter Rx request is done by the API and it is sent by the API towards the PCRF.

8. The method of claim 2, said method further comprising: receiving a meta-model that defines one or more parameters of the SDP.

9. The method of claim 8, wherein the meta-model is received from the AS via the exposed API.

10. An apparatus that executes the method of claim 1.

11. A non-transitory machine-readable medium including a computer program which executed performs the method of claim 1.

12. An online charging system (OCS) for use in a mobile telecommunications network, said OCS comprising:
  an exposed Application Programming Interface (API) having a first interface for communicating with an Application Server (AS) of a content provider;
  a second interface for communicating with a Policy and Charging Rules Function (PCRF); and
  a third interface for communicating with a Policy and Charging Enforcement Function (PCEF);
  wherein said OCS is operative to:
    receive a first request over the second interface for an initial charging policy report in response to a detection of a user's data session with the AS of the content provider;
    send a first response to the first request toward the PCRF over the second interface, including the requested initial charging policy report, such that said PCRF selects a first Policy Charging Control Rule (PCC-Rule) in accordance with said report for enforcement at the PCEF;
    receive a second request via the exposed API to perform an online subscription of the user to a sponsored data plan (SDP);
    send a second response to the second request toward the PCRF, including information about the SDP, such that said PCRF selects a second PCC-Rule in accordance with said information for enforcement at the PCEF;
    receive, in response to enforcement of the first PCC-Rule at the PCEF, a first trigger prompting association of the user's data session with a first Rating-Group (RG-1); and
    receive, in response to enforcement of the second PCC-Rule at the PCEF, a second trigger prompting association of the user's data session with a second Rating-Group (RG-2).

13. The OCS of claim 12, said OSC further being operative to:
  receive, in response to enforcement of the first PCC-Rule at the PCEF, a first trigger prompting association of the user's data session with a first Rating-Group (RG-1); and
  receive, in response to enforcement of the second PCC-Rule at the PCEF, a second trigger prompting association of the user's data session with a second Rating-Group (RG-2).

14. The OCS of claim 13, wherein the second interface is Diameter Sy interface.

15. The OCS of claim 13, wherein the first interface is a representational state transfer (REST) interface.

16. The OCS of claim 13, wherein the OCS is further operative to:
  build a Diameter Rx request to send information about information about the SDP toward the PCRF.

17. The OCS of claim 16, wherein building the Diameter Rx request is done by the API and it is sent by the API towards the PCRF.

18. The OCS of claim 13, wherein said OCS is further operative to:
  receiving a meta-model that defines one or more parameters of the SDP.

19. The OCS of claim 18, wherein the meta-model is received from the AS via the exposed API.

* * * * *